US009763006B2

(12) United States Patent
Acharya et al.

(10) Patent No.: US 9,763,006 B2
(45) Date of Patent: Sep. 12, 2017

(54) NOISE REDUCTION IN A MICROPHONE USING VOWEL DETECTION

(71) Applicant: International Business Machines Corporation, Armonk, NY (US)

(72) Inventors: Anusha Chippigiri Acharya, Richardson, TX (US); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/669,178

(22) Filed: Mar. 26, 2015

(65) Prior Publication Data

US 2016/0286309 A1 Sep. 29, 2016

(51) Int. Cl.
*H04B 15/00* (2006.01)
*H04R 3/02* (2006.01)
*G10L 25/93* (2013.01)

(52) U.S. Cl.
CPC ................ *H04R 3/02* (2013.01); *G10L 25/93* (2013.01)

(58) Field of Classification Search
CPC .......... H04R 3/02; H04R 3/007; H04R 29/00; H04R 29/004; H03G 3/20; H03G 3/345; H03G 7/00; H03G 11/00; G10L 25/03
USPC ................................ 381/55, 56, 58, 93, 94.8
See application file for complete search history.

(56) References Cited

U.S. PATENT DOCUMENTS 4,783,818 A 11/1988 Graupe et al.
5,737,719 A * 4/1998 Terry .................. G10L 21/0364 704/209
5,966,438 A * 10/1999 Romesburg ............. H04M 9/08 379/387.01
7,664,275 B2 2/2010 Osmanovic et al.
8,050,436 B2 11/2011 Kasanmascheff
8,116,485 B2 * 2/2012 Escott .................... H03G 7/007 381/104
8,396,236 B2 3/2013 Pape et al.
8,442,831 B2 5/2013 Sundararajan
8,452,035 B2 5/2013 Arndt et al.
8,571,243 B2 10/2013 Komagel et al.
2002/0169607 A1 * 11/2002 Miyanaga ............ G06K 9/6218 704/238
2010/0135507 A1 * 6/2010 Kino ...................... H03G 7/007 381/106

(Continued)

FOREIGN PATENT DOCUMENTS

DE EP2816557 A1 * 12/2014
WO 9005436 5/1990

OTHER PUBLICATIONS

Wikibooks, 2014, Engineering Acoustics Outdoor Sound Propagation.*

(Continued)

*Primary Examiner* — William A Jerez Lora
(74) *Attorney, Agent, or Firm* — Edward J. Wixted, III

(57) ABSTRACT

In an approach for reducing feedback in a device, wherein a first audio signal is received by a device. A processor determines that an intensity value of the first audio signal is increasing above a predetermined threshold value. A processor determines whether the first audio signal includes a vowel type sound. A processor responsive to determining that the first audio signal does not include the vowel type sound clips the first audio signal.

20 Claims, 2 Drawing Sheets

(56) References Cited

U.S. PATENT DOCUMENTS

| | | | | |
|---|---|---|---|---|
| 2011/0188685 | A1 | 8/2011 | Sheikh | |
| 2015/0205571 | A1* | 7/2015 | Duwenhorst | G06F 3/165<br>700/94 |

OTHER PUBLICATIONS

Greenberg, et al.; "Evaluation of feedback-reduction algorithms for hearing aids", Research Laboratory of Electronics, Massachusetts Institute of Technology; The Journal of the Acoustical Society of America.

Sharma, et al.; "Acoustic Study of Hindi Unaspirated Stop Consonants in Consonant-Vowel (CV) Context"; National Conference on Synergitic Trends in Engineering and Technology (STET-2014); International Journal of Engineering and Technical Research ISSN: 2321-0869 Special Issue.

Vuppala, et al.; "Recognition of consonant-vowel (CV) units under background noise using combined temporal and spectral preprocessing"; Int J. Speech Technol (2011); Published online: Aug. 11, 2011; Copyright: Springer Science+Business Media, LLC, 2011.

"2011 Scientific and Technical Report"; CSEM.

* cited by examiner

NOISE REDUCTION IN A MICROPHONE USING VOWEL DETECTION

BACKGROUND OF THE INVENTION

The present invention relates generally to the field of reducing audio feedback in microphones and more particularly to reducing the audio feedback using an auxiliary vowel detection sensor and a monotonic volume detector.

Microphones are an acoustic to electric transducers or sensors which converts sound in air into an electrical signal. Microphones are used in many different applications from telephones, hearing aids, public address systems for concert halls and studios, speech recognition, and many other applications. Most microphones today use electromagnetic induction, capacitance change, or piezoelectricity to produce an electrical signal from air pressure variations. The microphone typically needs to be connected to a preamplifier before the electrical signal can be amplified with an audio power amplifier or recorded.

A common occurrence when a microphone is connected to an amplifier, is audio feedback. The feedback is occurs when a sound loop exists between an audio input (for example, a microphone) and an audio output (for example a speaker). A situation where the feedback occurs is when an audio signal received by the audio input is amplified and passed out of the audio output. The sound from the audio output is received by the audio input again, amplified further, and passes through the audio output again. The frequency of the resulting sound is determined by many different factors, but the result is similar in the audio output making a loud squeal, whistle, or screech noise (referred to as feedback).

SUMMARY

Aspects of an embodiment of the present invention include an approach for reducing feedback in a device, wherein a first audio signal is received by a device. A processor determines that an intensity value of the first audio signal is increasing above a predetermined threshold value. A processor determines whether the first audio signal includes a vowel type sound. A processor responsive to determining that the first audio signal does not include the vowel type sound clips the first audio signal.

DETAILED DESCRIPTION

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.), or an embodiment combining software and hardware aspects which can generally be referred to herein as a "circuit," "module", or "system." Furthermore, aspects of the present invention can take the form of a computer program product embodied in one or more computer-readable medium(s) having computer readable program code/instructions embodied thereon.

Embodiments of the present invention recognize that there are no simple methods for avoiding the feedback when using a microphone. Embodiments of the present invention detect a vowel type sound and increase in sound intensity to determine if the audio signal should be clipped to reduce the feedback.

Implementation of embodiments of the invention can take a variety of forms, and exemplary implementation details are discussed subsequently with reference to the Figures.

Embodiments of the present invention disclose a method, computer program product, computer system, and apparatus to provide a standard process for reducing feedback when a microphone is connected to an amplified output.

The present invention will now be described in detail with reference to the Figures.

Figure 1:
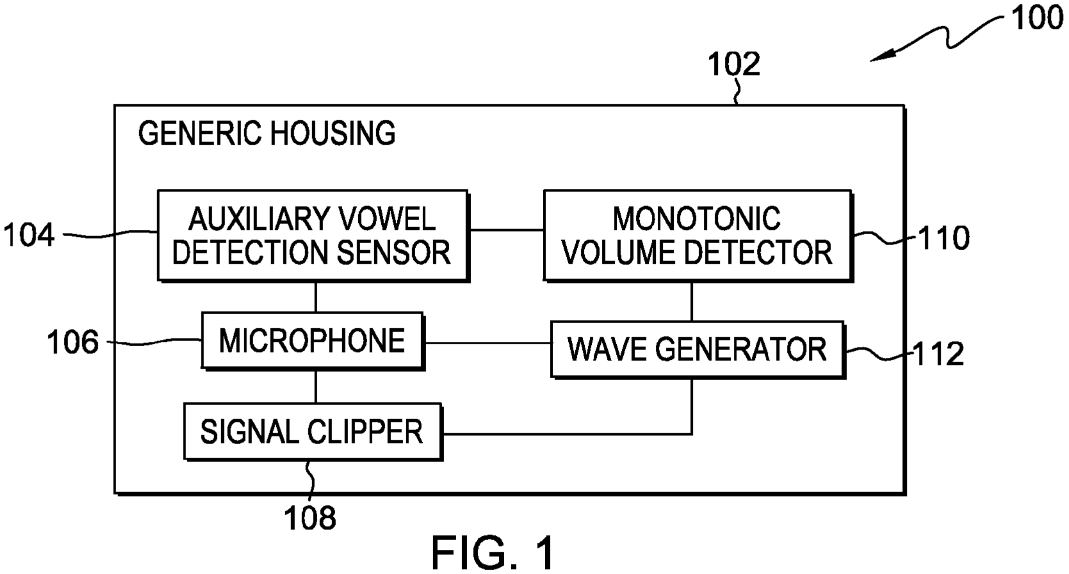
FIG. 1 depicts a block diagram of an auxiliary circuit, in accordance with one embodiment of the present invention.

FIG. 1 depicts a block diagram of computing environment 100 in accordance with one embodiment of the present invention. FIG. 1 provides an illustration of one embodiment and does not imply any limitations regarding computing environment 100 in which different embodiments can be implemented. In the depicted embodiment, computing environment 100 includes, but is not limited to, a generic housing 102. Computing environment 100 can include additional computing devices, servers, computers, components, or other devices not present.

Generic housing 102 is any casing or shell which protects or encloses the components from the environment. For example, generic housing 102 is a microphone housing. In the depicted embodiment, generic housing 102 encloses auxiliary vowel detection sensor 104, microphone 106, signal clipper 108, monotonic volume detector 110, wave generator 112, and battery 114. In other embodiments, generic housing 102 encloses auxiliary vowel detection sensor 104, microphone 106, signal clipper 108, monotonic volume detector 110, wave generator 112, battery 114, or other components to assist in the clipping of feedback (not shown).

Auxiliary vowel detection sensor 104 searches for vowels in the incoming audio signal and produces an output value based on the presence of a vowel. Auxiliary vowel detection sensor 104 is capable of detecting the distinct acoustic frequencies produced by vowels. The dominant characteristic in speech is the vowel or the vowel type sound. In one embodiment, auxiliary vowel detection sensor 104 identifies a vowel, or vowel type, sound due to the capacitance variation demonstrated between sounds which represent vowels and sounds which do not. In another embodiment, auxiliary vowel detection sensor 104 uses air density, velocity of the audio signal, and moisture in the air to detect for vowels. Auxiliary detection sensor 104 detects changes in air density, pulses of the air, and the changes in moisture, or the velocity of the air which are characteristics of vowel type sounds in speech. The changes listed are proven by algorithms which describe how the changes in the moisture, velocity, or density prove which the source of the sound is producing a vowel. There are several different types of vowel sounds, for example plain vowels, vowels in a consonant-vowel combination, or an elongated vowel sound (such as when sung); auxiliary vowel detection sensor 104 can detect a combination of these and other types of vowels. The vowel sounds are further distinguished by their phonemic length; or a phonemic length helps distinguish the vowel noise further. The phonemic length of the vowel relates to the stress applied to the syllables of the word and where the emphasis on the word is placed. In one embodiment, auxiliary vowel detection sensor 104 uses a series of algorithms to detect the presence of a vowel in the audio signal by calculating and determining if the phonemic length of a vowel is present in the audio signal. Comparing the vowel to a screech or feedback, the audio signal for a vowel has a longer wavelength and smoother wave envelope and the audio signal for a screech or feedback has a shorter wavelength and a harsher wave envelope. In one embodiments, auxiliary vowel detection sensor 104 uses the wave envelope and wavelength of the audio signal to detect the presence of a vowel in the audio signal. In other embodiments, auxiliary vowel detection sensor 104 uses the pitch, envelope, frequency, period, length, vowel contour, and other wave characteristics of the audio signal to analyze the audio signal.

In one embodiment, auxiliary vowel detection sensor 104 is a carbon nanotube super capacitor. In other embodiments, auxiliary vowel detection sensor 104 is another type of capacitor, for example, a ceramic capacitor, film capacitor, film power capacitor, electrolytic capacitor, super capacitor, class-y and class-x capacitor, and other forms of capacitors, which are used as filters for a circuit coupled with a computing device. A capacitor is a passive two-terminal electrical component used to store energy electrostatically in an electric field. The form of a capacitor includes at least two electrical conductors separated by a dielectric. In the depicted embodiment, auxiliary vowel detection sensor 104 is located within generic housing 102. In other embodiments, auxiliary vowel detection sensor 104 can be located externally from generic housing 102, so long as auxiliary vowel detection sensor 104 can communicate with microphone 106, signal clipper 108, monotonic volume detector 110, wave generator 112, and other components used to reduce the feedback in the sound system.

Microphone 106 is an acoustic-to-electric transducer or sensor which converts the sounds in air into an electrical signal. Microphone 106 can be, for example, a dynamic, electret condenser, piezoelectric, or any other form or style of microphone which convert acoustic sounds into an electrical signal. A dynamic microphone uses electromagnetic induction in the production of an electromotive force across a conductor when the conductor is exposed to a varying magnetic field. An electret condenser microphone is a microphone which eliminates the need for a polarizing power supply by using a permanently charges material. A piezoelectric microphone detects sound waves which have the piezoelectric material, creating a voltage change to produce sound. In the depicted embodiment, microphone 106 is located within generic housing 102. In other embodiments, microphone 106 can be located externally from generic housing 102, so long as microphone 106 can communicate with auxiliary vowel detection sensor 104, signal clipper 108, monotonic volume detector 110, wave generator 112, and other components used to reduce the feedback in the system.

Signal clipper 108 is a program or a device which is able to "clip" or "cut" an audio signal once the audio signal exceeds a predetermined threshold for increasing intensity with no vowel or vowel type sounds in the audio signal for reducing the feedback in the audio signal. In one embodiment, signal clipper 108 is a program or device which receives the audio signal from microphone 106, monotonic volume detector 110 or wave generator 112 and performs the clipping or cutting the audio signal. Clipping is a form of waveform distortion which occurs when an amplifier is overdriven and attempts to deliver an output voltage or current beyond the amplifiers maximum capability. Signal clipper 108 clips the audio signal to a value within the limits of the amplifier's power supply, which results in a reduction in feedback. Signal clipper 108 cuts off the extra audio signal which is beyond the maximum capability of the amplifier, resulting in a wave becoming a distorted square-wave-type waveform. In one embodiment, signal clipper 108 clips or cuts an audio signal to the maximum capacity of the amplifier. In other embodiments, signal clipper 108 cuts or clips the audio signal to a value lower than the maximum capacity of the amplifier. In the depicted embodiment, signal clipper 108 is located within generic housing 102. In other embodiments, signal clipper 108 can be located externally from generic housing 102, so long as signal clipper 108 can communicate with auxiliary vowel detection sensor 104, microphone 106, monotonic volume detector 110, wave generator 112, and other components used to reduce the feedback in the system.

Monotonic volume detector 110 is a program or a device which monitors the incoming audio signal and determines if the audio signal is periodically increasing in intensity. In one embodiment, monotonic volume detector 110 is a program which is stored within persistent storage 308 and is accessible by auxiliary vowel detection sensor 104, microphone 106, wave generator 112, or signal clipper 108. In other embodiments, monotonic volume detector is a device residing within generic housing 102 and receives the audio signal from microphone 106. The intensity of the audio signal is the acoustic or sound power (W) per unit area (m) presented in the equation $W/m^2$. In one embodiment, an increase in intensity occurs when an audio signal is received by an audio input and the audio signal is amplified and passed to an audio output. The audio input receives the amplified audio signal and continues to increase the amplification of the audio signal and passes the audio signal back to the audio output resulting in an increase in intensity of the audio signal (producing feedback). In other embodiments, the audio signal can increase in intensity through other methods or processes so long as the increase in intensity produces feedback which monotonic volume detector 110 can monitor. In the depicted embodiment, monotonic volume detector 110 is located in generic housing 102. In other embodiments, monotonic volume detector 110 can be located externally from generic housing 102, so long as monotonic volume detector 110 can communicate with auxiliary vowel detection sensor 104, microphone 106, signal clipper 108, wave generator 112, and other components used to reduce the feedback in the system.

Wave generator 112 is a piece of electronic equipment used to generate electrical waveforms. The waveforms can be either repetitive or single-shot. In one embodiment, wave generator 112 creates waveforms for vowel type sounds, and non-vowel type sounds received from microphone 106. In other embodiments, wave generator 112 creates waveforms for audio signals which are not only vowel or vowel type sounds which are received from microphone 106. Wave generator 112 receives the audio signal from microphone 106. In other embodiments, wave generator 112 receives the audio signals from devices other than microphone 106 (not shown). In one embodiment, the waveforms which are created by wave generator 112 are able to be sent and received by other devices to test and analyze the audio signal. Sending the waveforms to another device in one example is to confirm which wave generator 112 is operating properly, or is used to location a fault in wave generator 112, microphone 106, or signal clipper 108. Wave generator 112 generates any arbitrarily defined waveform as an output. In some embodiments, wave generator 112 encloses an attenuator, various means of modulating the output waveform, or the ability to periodically sweep the frequency of the output waveform between two operator defined limits or computer defined limits. In other embodiments, wave generator 112 uses built-in waveforms, such as exponential rise and fall times, sin(x/x), and cardiac. In the depicted embodiment, wave generator 112 is located within generic housing 102. In other embodiments, wave generator 112 can be located externally from generic housing 102, so long as wave generator 112 can communicate with auxiliary vowel detection sensor 104, microphone 106, signal clipper 108, monotonic volume detector 110, and other components used to reduce the feedback in the system.

Figure 2:
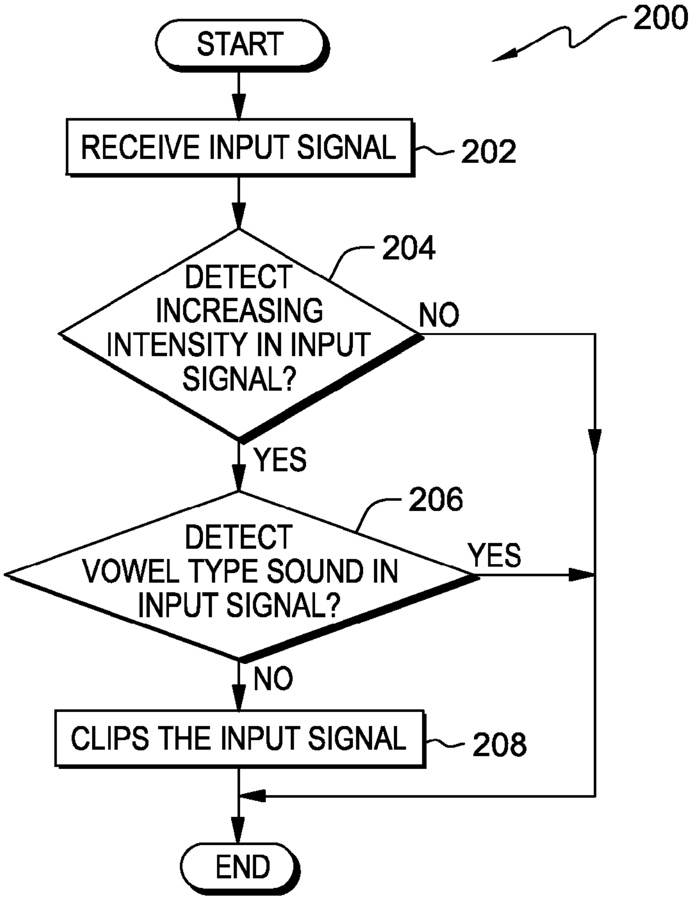
FIG. 2 depicts a flowchart of the operational steps of a method for reducing the audio feedback in a sound system, within the computing environment of FIG. 1, in accordance with one embodiment of the present invention.

FIG. 2 depicts a flowchart 200 of the steps of receiving an audio signal and detecting if the audio signal needs to be modified to reduce feedback within computing environment 100 of FIG. 1, in accordance with an embodiment of the present invention. Flowchart 200 depicts the assessment and potential modification to an audio signal received by an auxiliary vowel detection sensor 104 and a monotonic volume detector 110.

In step 202, an audio signal is received from an external source. The external source can be for example a musical instrument, a human voice, a speaker, or any other source which can produce a noise. In one embodiment, auxiliary vowel detection sensor 104 receives the audio signal from an external source. In one embodiment, microphone 106 receives the audio signal from an external source. In one embodiment, auxiliary vowel detection sensor 104 and microphone 106 receive the audio signal concurrently from an external source. In one embodiment, auxiliary vowel detection sensor 104 and microphone 106 receive the audio signal consecutively from an external source. In other embodiments, other components receive the audio signal from an external source.

In decision 204, the audio signal is analyzed to determine if the audio signal is increasing in intensity. In one embodiment, monotonic volume detector 110 analyzes the audio signal. If monotonic volume detector 110 determines from the analysis which the audio signal is increasing in intensity, monotonic volume detector 110 sends the audio signal to auxiliary vowel detection sensor 104 to decide if the audio signal has a vowel or vowel type sound (Yes branch, proceed to decision 206). If monotonic volume detector 110 determines from the analysis which the audio signal is not increasing in intensity, monotonic volume detector 110 does not perform any further actions on the audio signal (No branch). In one embodiment, monotonic volume detector 110 utilizes a predetermined value to determine if the audio signal is increasing in intensity and periodically analyzes the audio signal.

In an example embodiment, monotonic volume detector 110 receives the audio signal from microphone 106. Monotonic volume detector 110 then performs a calculation using equation $W/m^2$ or other algorithms which are used to determine if an audio signal is periodically increasing in intensity. The performed calculation has an incorporated predetermined value or predetermined threshold which monotonic volume detector 110 uses to determine if the audio signal is increasing in intensity, a quantity of audio signals which fall below the predetermined threshold can potentially not be caused by feedback, but anything over the predetermined threshold is caused by feedback.

In decision 206, the audio signal is analyzed to determine if the audio signal includes a vowel type sound. In one embodiment, auxiliary vowel detection sensor 104 analyzes the audio signal. In other embodiments, auxiliary vowel detection sensor 104 and wave generator 112 analyzes the audio signal. Wave generator 112 creates a wave model of the audio signal, which auxiliary vowel detection sensor 104 uses to determine the characteristics of the audio signal and determines if the audio signal includes a vowel or vowel type sound. If auxiliary vowel detection sensor 104 determines from the analysis which a vowel or a vowel type sound is associated with the audio signal, auxiliary vowel detection sensor 104 does not perform any further actions on the audio signal (Yes branch). If auxiliary vowel detection sensor 104 determines from the analysis that a vowel or a vowel type sound is not associated with the audio signal, auxiliary vowel detection sensor 104 sends the audio signal to be clipped or cut (No branch, proceed to decision 208).

In one example, auxiliary vowel detection sensor 104 receives the audio signal from monotonic volume detector 110. Auxiliary vowel detection sensor 104 performs an analysis on the audio signal to determine the presence of a vowel in the audio signal. Auxiliary vowel detection sensor 104 inspects different characteristics of the audio signal, such as for example wavelength, wave envelope, and pitch, frequency, compression, rarefaction, or cycle rate. Auxiliary vowel detection sensor 104 uses the characteristics to determine the presence of a vowel or a vowel type sound in the audio signal.

In step 208, the audio signal is clipped or cut to remove the presence of feedback in the audio signal. In one embodiment, signal clipper 108 performs the clipping or cutting of the audio signal. In other embodiments, another component performs the clipping or cutting of the audio signal. In one embodiment, signal clipper 108 determines a predetermined threshold value, which if the audio signal's amplitude is greater than the predetermined threshold value, signal clipper 108 clips or cuts the audio signal to at least the predetermined threshold value. The cutting or clipping stops the audio signal from increasing in intensity which causes feedback. In other embodiments, signal clipper 108 is instructed by monotonic volume detector 110 or wave generator 112 the predetermined threshold value for the amplitude, or a calculated amplitude of the audio signal to clip or cut, so the audio signal cannot continue to increase in intensity which causes feedback. In another embodiments, signal clipper 108 uses another component to determine the proper amount to clip or cut the audio signal amplitude, so the audio signal does not continue to increase in intensity. In other embodiments, signal clipper 108 uses wave generator 112 to determine the proper amount to clip or cut the audio signal amplitude, so the audio signal does not continue to increase in intensity. Once the audio signal amplitude is clipped or cut, the audio signal is held to a fixed wave structure, reducing or removing the feedback. In one embodiment, the clipping or cutting occurs once the device detects values of both/either increasing intensity, or presence of a vowel or vowel type sound which exceed a minimum value. In other embodiments, the clipping or cutting occurs periodically.

Figure 3:
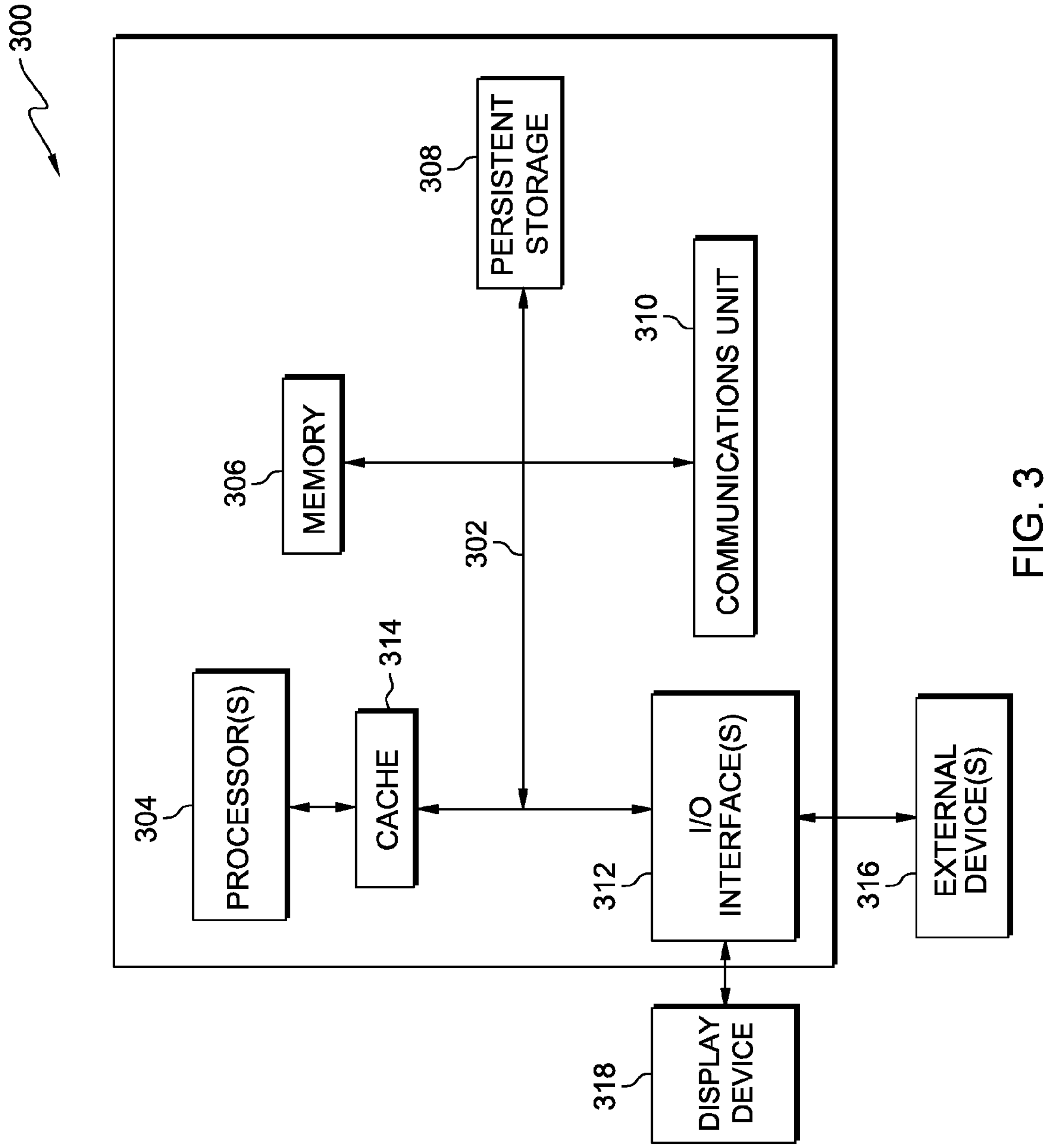
FIG. 3 depicts a block diagram of internal and external components of generic housing of FIG. 1, in accordance with one embodiment of the present invention.

FIG. 3 depicts a block diagram 300 of components of generic housing 102, in accordance with an illustrative embodiment of the present invention. It should be appreciated that FIG. 3 provides only an illustration of one implementation and does not imply any limitations with regard to the environments in which different embodiments can be implemented. Many modifications to the depicted environment can be made.

Generic housing 102 include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In one embodiment, memory 306 includes random access memory (RAM) and cache memory 314. In general, memory 306 can include any suitable volatile or non-volatile computer-readable storage media.

Auxiliary vowel detection sensor 104, signal clipper 108, monotonic volume detector 110, and wave generator 112 are stored for execution by one or more of the respective computer processors 304 of generic housing 102 via one or more memories of memory 306 of generic housing 102. In one embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media which is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 310, in the examples, provides for communications with other data processing systems or devices, including generic housing 102. In the examples, communications unit 310 includes one or more network interface cards. Communications unit 310 can provide communications through the use of either or both physical and wireless communications links. Auxiliary vowel detection sensor 104 can be downloaded to persistent storage 308 of generic housing 102 through communications unit 310 of generic housing 102.

I/O interface(s) 312 allows for input and output of data with other devices that can be connected to generic housing 102. For example, I/O interface 312 can provide a connection to external devices 316 such as a keyboard, keypad, camera, a touch screen, and/or some other suitable input device. External devices 316 can also include portable computer-readable storage media such as, for example, thumb drives, portable optical or magnetic disks, and memory cards. Software and data used to practice embodiments of the present invention, e.g., function of detection sensor 104, signal clipper 108, monotonic volume detection 110 and wave generator 112 can be stored on such portable computer-readable storage media and can be loaded onto persistent storage 308 of generic housing 102 via I/O interface(s) 312 of generic housing 102. Software and data used to practice embodiments of the present invention, e.g., of auxiliary vowel detection sensor 104, signal clipper 108, monotonic volume detection 110 and wave generator 112 can be stored on such portable computer-readable storage media and can be loaded onto persistent storage 308 of generic housing 102 via I/O interface(s) 312 of generic housing 102. I/O interface(s) 312 also connect to a display 318.

Display 318 provides a mechanism to display data to a user and can be, for example, a computer monitor.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks present in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reducing feedback in a device, the method comprising:

receiving, by one or more processors, a first audio signal in a device;

determining, by one or more processors, that a rate of increase of an intensity value of the first audio signal is above a predetermined threshold value;

determining, by one or more processors, whether the first audio signal includes a vowel type sound; and responsive to determining that the rate of increase of the intensity value of the first audio signal is above a predetermined threshold value and the first audio signal does not include the vowel type sound, clipping, by one or more processors, the first audio signal.

2. The method of claim 1, wherein determining whether the first audio signal includes the vowel type sound further comprises:

analyzing, by one or more processors, changes in air density, changes in velocity of the first audio signal, and changes in moisture in the air.

3. The method of claim 1, further comprising:

maintaining, by one or more processors, the intensity value of the first audio signal at a threshold value below a maximum capacity of an amplifier.

4. The method of claim 3, wherein maintaining the intensity value of the first audio signal at the threshold value below the maximum capacity of the amplifier, comprises:

determining, by one or more processors, whether the intensity value of the first audio signal is increasing above the maximum capacity of the amplifier; and responsive to determining that the intensity value of the first audio signal is increasing above the maximum capacity of the amplifier, clipping, by one or more processors, the first audio signal.

5. The method of claim 1, wherein determining whether the first audio signal includes the vowel type sound further comprises:

analyzing, by one or more processors, the first audio signal by comparing capacitance variation demonstrated between a first audio sound that represents the vowel type sound and a second audio sound that does not represent the vowel type sound.

6. The method of claim 1, further comprising:

clipping, by one or more processors, a second audio signal at an equivalent value of the intensity value of the second audio signal if a vowel sound or the vowel type sound is not present in the second audio signal.

7. The method of claim 1, wherein determining that the rate of increase of the intensity value of the audio signal is above the predetermined threshold value comprises:

calculating, by one or more processors, a value for the rate of increase in the intensity value of the audio signal; and calculating, by one or more processors, a maximum threshold value for the intensity value of the audio signal.

8. A computer program product for reducing feedback in a device, the method comprising:

one or more computer readable storage media and program instructions stored on the one or more computer readable storage media, the program instructions comprising:

program instructions to receive a first audio signal in a device;

program instructions to determine that a rate of increase of an intensity value of the first audio signal is above a predetermined threshold value;

program instructions to determine whether the first audio signal includes a vowel type sound; and responsive to the program instructions to determine that the rate of increase of the intensity value of the first audio signal is above a predetermined threshold value and the program instructions to determine that the first audio signal does not include the vowel type sound, program instructions to clip the first audio signal.

9. The computer program product of claim 8, wherein the program instructions to determine whether the first audio signal includes the vowel type sound further comprise:

program instructions to analyze changes in air density, changes in velocity of the first audio signal, and changes in moisture in the air.

10. The computer program product of claim 8, further comprising:

program instructions to maintain the intensity value of the first audio signal at a maximum capacity of an amplifier.

11. The computer program product of claim 10, wherein the program instructions to maintain the intensity value of the first audio signal at the maximum capacity of the amplifier comprise:

program instructions to determine whether the intensity value of the first audio signal is increasing above the maximum capacity of the amplifier; and responsive to determining that the intensity value of the first audio signal is increasing above the maximum capacity of the amplifier, program instructions to clip the first audio signal.

12. The computer program product of claim 8, wherein the program instructions to determine whether the first audio signal includes a vowel type sound further comprise:

program instructions to analyze the first audio signal by comparing capacitance variation demonstrated between a first audio sound that represents the vowel type sound and a second audio sound that does not represent the vowel type sound.

13. The computer program product of claim 8, further comprising:

program instructions to clip a second audio signal at an equivalent value of the intensity value of the second audio signal if a vowel sound or the vowel type sound is not present in the second audio signal.

14. The computer program product of claim 8, wherein the program instructions to determine that the rate of increase of the intensity value of the audio signal is above the predetermined threshold value comprise:

program instructions to calculate a value for the rate of increase in the intensity value of the audio signal; and program instructions to calculate a maximum threshold value for the intensity value of the audio signal.

15. A computer system for reducing feedback in a device, the computer system comprising:

one or more computer processors, one or more computer readable storage media, and program instructions stored on the one or more computer readable storage media for execution by at least one of the one or more processors, the computer instructions comprising:

program instructions to receive a first audio signal in a device;

program instructions to determine that a rate of increase of an intensity value of the first audio signal is above a predetermined threshold value;

program instructions to determine whether the first audio signal includes a vowel type sound; and responsive to the program instructions to determine that the rate of increase of the intensity value of the first audio signal is above a predetermined threshold value and the program instructions to determine that the first audio signal does not include the vowel type sound, program instructions to clip the first audio signal.

16. The computer system of claim 15, wherein the program instructions to determine whether the first audio signal includes the vowel type sound further comprise:

program instructions to analyze changes in air density, changes in velocity of the first audio signal, and changes in moisture in the air.

17. The computer system of claim 15, further comprising:

program instructions to maintain the intensity value of the first audio signal at a maximum capacity of an amplifier.

18. The computer system of claim 17, wherein the program instructions to maintain the intensity value of the first audio signal at the maximum capacity of the amplifier comprise:

program instructions to determine whether the intensity value of the first audio signal is increasing above the maximum capacity of the amplifier; and responsive to determining that the intensity value of the first audio signal is increasing above the maximum capacity of the amplifier, program instructions to clip the first audio signal.

19. The computer system of claim 15, wherein the program instructions to determine whether the first audio signal includes a vowel type sound further comprise:

program instructions to analyze the first audio signal by comparing capacitance variation demonstrated between a first audio sound that represents the vowel type sound and a second audio sound that does not represent the vowel type sound.

20. The computer system of claim 15, further comprising:

program instructions to clip a second audio signal at an equivalent value of the intensity value of the second audio signal if a vowel sound or the vowel type sound is not present in the second audio signal.

* * * * *